United States Patent [19]
Van Der Horst

[11] 3,852,858
[45] Dec. 10, 1974

[54] INDEX PIN FOR BRACING AND ORIENTING THE TOOL TURRET OF MACHINE TOOLS

[75] Inventor: Eberhard Van Der Horst, Erkelenz, Germany

[73] Assignee: A. Monforts, Monchengladbach, Germany

[22] Filed: Nov. 12, 1973

[21] Appl. No.: 415,019

[30] Foreign Application Priority Data
Nov. 14, 1972 Germany.............................. 2255647

[52] U.S. Cl. ......................... 29/48.5 A, 308/237 A
[51] Int. Cl............................................. B23b 3/16
[58] Field of Search............. 29/48.5 R, 48.5 A, 49, 29/57, 39; 308/237 A

[56] References Cited
UNITED STATES PATENTS
| | | | |
|---|---|---|---|
| 1,575,742 | 3/1926 | Drake et al. | 29/57 |
| 2,423,696 | 7/1947 | Fink | 29/57 |
| 3,797,363 | 3/1974 | Nohejl | 29/48.5 |

Primary Examiner—Gil Weidenfeld
Attorney, Agent, or Firm—Herbert L. Lerner

[57] ABSTRACT

In a machine tool having a machine frame and a tool turret rotatably mounted therein, there is provided an index pin for bracing and orienting the tool turret. The index pin is extensible between an arm of the tool turret and a part of the machine frame for holding the tool turret against rotary motion relative to the machine frame, and includes a core member and a cylindrical member disposed around and coaxial to the core member at a spaced distance therefrom, the cylindrical member being firmly secured to a free end of the core member.

4 Claims, 1 Drawing Figure

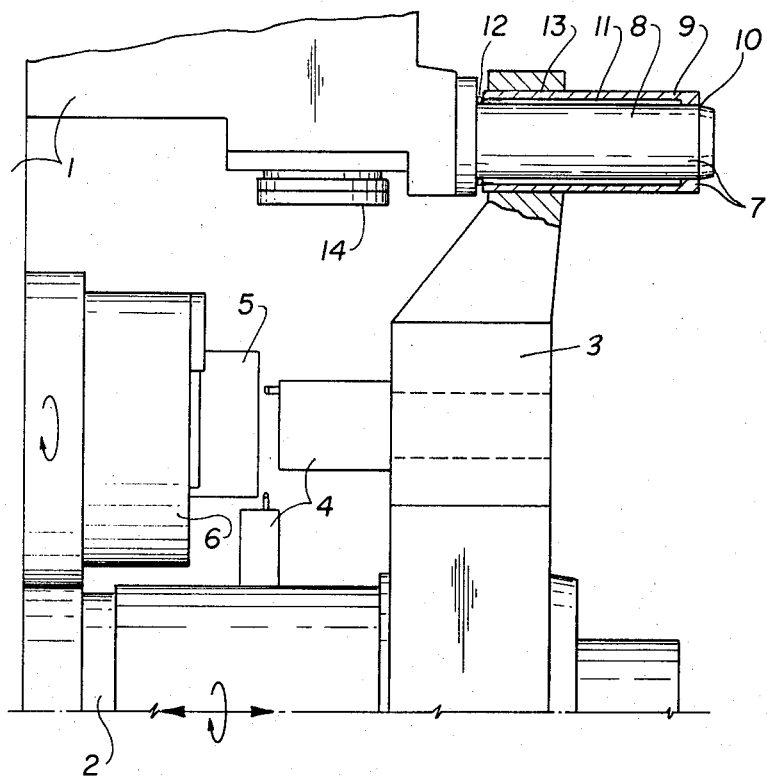

INDEX PIN FOR BRACING AND ORIENTING THE TOOL TURRET OF MACHINE TOOLS

The invention relates to an index pin for bracing and orienting the tool turret of a machine tool, such as a lathe, especially. Such a construction can have, for example, a longitudinally or axially displaceable tool turret which is held tight by the index pin which is received in an index bore formed in the frame of the machine tool, during a machining operation. The term "index pin" is employed quite generally and, as an example, also includes flat guides which engage in corresponding groove-like recesses formed in the tool turret and secure the latter against rotation in the operating position thereof.

Index pins of the aforementioned and other types are supposed to orient or adjust the tool turret in machine tools and to form a counter-bearing or support against forces that are applied to the tool turret when the tools mounted on the tool turret are in contact with a workpiece. Such forces, as a rule, have a very large azimuthal or transverse component with respect to the turret shaft. This azimuthal force component causes, above all, rather easy bending of the index pin which usually extends parallel to the turret shaft. The bending of the index pin is approximately proportional to the third power of the length between the point of attachment of the index pin to the machine tool frame and the index bore formed in the tool turret. As the tool turret travels back and forth in axial direction, the index bore formed therein is, in effect, displaced along the index pin, and the bending varies with the feed of the tool turret or the tool so that, for example, during a turning operation, the workpiece being machined is formed with a conical section instead of a cylindrical section. This bending of the index pin can be reduced by "beefing up" or reinforcing the index pin or by increasing the number of the index pins, but cannot be eliminated entirely.

It is accordingly an object of the invention to provide an index pin for bracing and orienting or adjusting the tool turret of a machine tool which avoids the foregoing disadvantages of the heretofore known index pins of this general type and which, more particularly, avoids fundamentally the disadvantages resulting from the bending of the index pins due to forces that are azimuthly or transversely executed thereon.

With the foregoing and other objects in view, there is provided in accordance with the invention, in a machine tool having a machine frame and a tool turret rotatably mounted thereon, an index pin for bracing and orienting the tool turret, the index pin being extensible between an arm of the tool turret and a part of the machine frame for holding the tool turret against rotary motion relative to the machine frame, the index pin including a core member, and a cylindrical member disposed around and coaxial to the core member at a spaced distance therefrom, the cylindrical member being firmly secured to a free end of the core member.

The result of this construction in accordance with the invention is that the tool turret formed with the index bore, in each longitudinal or axial position thereof, indirectly grips or engages the cylindrical member, which coaxially surrounds the core of the index pin, at the free end of the index pin as the tool turret travels in axial direction thereof from one end position to another end position of the operating feed thereof, the bending of the index pin according to the invention does not vary because the free end of the index pin is indirectly engaged in the index bore in every feed position of the tool turret.

Theoretically, this bending of the index pin of the invention would not be uniform overall for a force of the same strength that is exerted at various locations thereof. In fact, the core of the index pin, at which the force always (indirectly) is applied to the end or tip thereof also is subjected theoretically to a constant bending. The extent of the bending of the superimposed cylindrical member should depend theoretically on the particular location along the length of the cylindrical member at which the respective force is applied i.e., at which axial position of the tool turret it is directly absorbed. It has surprisingly been found that, in any case, within limits of accuracy or tolerances of ± 0.01 mm which are required for machine tools, a non-uniform bending is actually not measurable and is not visible on the machined workpiece especially if it is a turned member. Although the index pin according to the invention bends to a greater or lesser extent in accordance with the respective amount of force exerted thereon during the machining operation (generally in the order of magnitude of at most tenths of a mm), this bending is not noticeable during the machining feed of the tool turret and, accordingly, in the machining accuracy thereof, because the bending actually has substantially the same absolute value in every feed position of the tool turret.

In accordance with another feature of the invention, a ring seal closes the cylindrical gap formed between the core member and the cylindrical member at the free end of the cylindrical member which is located opposite the free end of the core member, so that the cylindrical member is bendable with respect to the core member.

In accordance with a further and more specific embodiment of the invention, the ring seal is located on the core between the free end of the cylindrical member and the machine frame and is slidably engaged in sealing relationship with the free end of the cylindrical member.

In accordance with an alternate embodiment of the invention, the ring seal is formed of a conventional elastic material such as rubber or a resilient plastic material and is located on the core between the peripheral surface thereof and the inner peripheral surface of the cylindrical member at the free end thereof.

Other features which are considered as characteristic for the invention are set forth in the appended claims.

Although the invention is illustrated and described herein as embodied in index pin for bracing and orienting the tool turret of machine tools, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing which shows, in elevational view, partly broken and partly in section, the upper half of a machine tool having a tool turret and index pin in accordance with the invention of the instant application.

Referring now to the Drawing, there is shown therein a turret-type machine tool having a machine frame 1 in which a turret shaft 2 is floatingly mounted. Turret arms 3 are carried by the turret shaft 2. Tools 4 are suitably mounted on the turret shaft 2 or the turret arms 3 of the turret or on both thereof and, through suitable actuation of the turret i.e., by rotation thereof in either rotary direction and/or by displacement thereof in either axial direction as represented by the arrows at the bottom of the figure, the tools 4 perform a machining operation on a workpiece 5 which is clamped in a chuck mounted on a rotatable workpiece spindle 6 journalled in the machine frame 1. The turret shaft 2 is rotatable as well as longitudinally or axially displaceable, in a bearing located in the machine frame 1. The rotatability of the turret shaft 2 permits the tool 4 which is coordinated or associated with one of the turret arms 3 to be replaced by that of one of the other turret arms 3. Through the axial or longitudinal displacement of the turret, the tools are actuated or controlled during the machining operation.

In the embodiment illustrated in the drawing, an index pin 7 constructed in accordance with the invention is provided. The index pin 7 has a core 8 which is firmly secured to the machine frame 1 on the side thereof disposed opposite the turret shaft 2, with the workpiece spindle 6 located therebetween. A cylinder 9 is placed over and around the core 8 of the index pin 7 and is firmly coupled or united with the core 8 by being adhesively secured, welded, threadedly secured or in any other way secured thereto solely at the free end of the core 8. The location 10 at which the core 8 and the cylinder 9 are firmly coupled one to the other also represents the free end of the index pin 7 as shown in the figure. A ring seal 12 is advantageously provided at the end of the cylinder 9 in order to prevent foreign material or impurities from entering the cylindrical gap 11 located between the core 8 and the cylinder 9. The ring seal 12 can be disposed both between the free end of the cylinder 9, which is located directly adjacent the secured end of the core 8, and the machine frame 1, as well as between the free end of the cylinder 9 and the core 8, when the elasticity of the ring seal 12 is adequate.

When the index bore 13 formed in the turret arm 3 rides up on the index pin 7 due to the longitudinal or axial displacement of the turret shaft 2, and thereby adjusts or orients the tool turret, and if a tool 4 should then come into contact with the workpiece 5, a specific force is exerted on the tool turret in azimuthal or transverse direction with respect to the turret shaft 2, which corresponds to the force required for machining the workpiece 5. This force must be partly absorbed by the index pin 7. Accordingly, the index pin 7 bends to a slight extent. If the index pin 7 were completely solid as in the heretofore known machines, the bending of the index pin 7 would become ever less as the spacing of the turret arm 3 from the machine frame 1 decreased, with the result that, for example, a workpiece section would not be cylindrical, as desired, but rather, would become slightly conical. The index pin 7 is constructed in accordance with the invention, however, so that the turret arm 3 always indirectly engages the free end 10 of the index pin 7. As noted hereinbefore, the bending of the index pin 7 does not markedly vary during the feed of the turret. Irregularities during the turning of workpieces due to non-uniform bending of the index pin 7 can thus no longer arise by employing the invention of the instant application. In the case of one embodiment of the index pin of the invention, the area moments of inertia of the core 8 and the cylinder 9 were in the ratio of about 1 to 2.

The index pin 7 according to the invention is, however, surprisingly not only advantageous for preventing machining irregularities which originate from the fact that the index pin is loaded or stressed in azimuthal direction with respect to the turret axis 2, but also it is very advantageous when there is a stressing or bracing between the index pin 7 and the turret shaft 2. Such a bracing can arise if the spacing between the index pin 7 and the turret shaft 2 does not correspond exactly with the clearance between the latter and the surface of the turret arm 3 that defines the index bore 13. In the case of the heretofore known conventional solid index pins, this bracing would vary during axial or longitudinal displacement of the turret.

In contrast thereto, with the index pin 7 of the invention of the instant application, the bracing actually remains the same over the entire longitudinal or axial feed of the turret. Such a bracing can thus no longer result in a partial or total clamping or reverse further displacement of the turret arm 3 or the index bore 13 formed therein. Also, damage to the turret shaft 2 is avoided by such a bracing.

The new index pin 7 is also advantageous in that the entire index pin 7 need not be exchanged when the superimposed cylinder 9 becomes worn, but rather only the cylinder 9 need be replaced.

I claim:

1. In a machine tool having a machine frame and a tool turret rotatably mounted thereon, an index pin for bracing and orienting the tool turret, said index pin being extensible between an arm of the tool turret and a part of the machine frame for holding the tool turret against rotary motion relative to the machine frame, said index pin comprising a core member, and a cylindrical member disposed around and coaxial to said core member at a spaced distance therefrom, said cylindrical member being firmly secured to a free end of said core member.

2. Index pin according to claim 1 wherein the space between said core member and said cylindrical member forms a cylindrical gap, and including a ring seal closing said gap at the free end of said cylindrical member which is located opposite the free end of said core member so that said cylindrical member is bendable with respect to said core member.

3. Index pin according to claim 2 wherein said ring seal is located on said core between said free end of said cylindrical member and the machine frame and is slidably engaged in sealing relationship with said free end of said cylindrical member.

4. Index pin according to claim 2 wherein said ring seal is elastic and is located on said core between the peripheral surface thereof and the inner peripheral surface of said cylindrical member at said free end thereof.

* * * * *